United States Patent [19]

Rauch, Sr.

[11] Patent Number: 4,575,493

[45] Date of Patent: Mar. 11, 1986

[54] LOW EXPANSION, MULTIBAND TRANSMITTING GLASSES AND GLASS-CERAMICS

[75] Inventor: Harry W. Rauch, Sr., Lionville, Pa.

[73] Assignee: General Electric Co., Philadelphia, Pa.

[21] Appl. No.: 358,576

[22] Filed: Mar. 16, 1982

[51] Int. Cl.[4] .................... C03C 3/062; C03C 3/253; C03C 4/10; C03C 10/02

[52] U.S. Cl. .................................... 501/10; 250/338; 501/42; 501/73; 501/904

[58] Field of Search ...................... 501/42, 10, 73, 904

[56] References Cited

U.S. PATENT DOCUMENTS

| | | | |
|---|---|---|---|
| 2,920,971 | 1/1960 | Stookey | 501/10 X |
| 3,573,939 | 4/1971 | Beall | 501/73 X |
| 3,745,032 | 7/1973 | Miller et al. | 501/42 |
| 3,769,047 | 10/1973 | Dumbaugh | 501/42 |
| 3,982,952 | 9/1976 | Dumbaugh | 501/42 |

FOREIGN PATENT DOCUMENTS

| | | | |
|---|---|---|---|
| 6601607 | 8/1967 | Netherlands | 501/42 |
| 6717093 | 6/1968 | Netherlands | 501/42 |

*Primary Examiner*—Helen M. McCarthy
*Attorney, Agent, or Firm*—Allen E. Amgott

[57] ABSTRACT

Compositions of metal oxides which may be melted and cooled to produce glasses are disclosed. The glasses may be heat treated to produce glass-ceramics. The glasses have good transmittances for electromagnetic radiation in the ultraviolet, infrared and visible spectra, while the glass-ceramics have good transmittances of infrared radiation. Other physical properties make these materials desirable for purposes such as radomes.

8 Claims, 2 Drawing Figures

SPECULAR TRANSMITTANCE OF EXAMPLE A, 1.3MM THICK, POLISHED SPECIMEN

TYPICAL HEAT TREATMENT SCHEDULE FOR CONVERTING THE GLASSES TO GLASS-CERAMICS

LOW EXPANSION, MULTIBAND TRANSMITTING GLASSES AND GLASS-CERAMICS

The Government has rights in this invention pursuant to Contract N00014-78-0466 awarded by the Department of the Navy.

BACKGROUND OF THE INVENTION

1. Field of the Invention

This invention relates generally to glasses with good transmittance in the ultraviolet, visible, and infrared regions of the electromagnetic spectrum, while also having low thermal expansion characteristics. These glasses also can be converted, by appropriate heat treatment, to glass ceramics with little or no loss in infrared transmission and also possessing dielectric constants which vary only slightly between about 20° C. and 500° C.

2. Description of the Prior Art

U.S. Pat. No. 3,745,032 pertains to glasses composed primarily of germanium oxide with seven or more other oxides in smaller percentages. The IR transmittance, as illustrated in the graph of FIG. 1, peaks at a wavelength of about 4 microns, decreasing from that point to no transmittance above about 6 microns. Transmittance in the range of 5 to 5.5 microns (a primary range of interest) is a maximum at 5 microns of 60 percent to a maximum at 5.5 microns of about 33 percent, both for Example III.

U.S. Pat. No. 3,769,047 relates to infrared transmitting glasses comprising germania, alumina and lanthana to which are added one or more other oxides to depress the liquidus temperature of the glass. Transmittance of a 2 mm thick specimen is given for six glasses and ranges from 53 to 63 percent at a wavelength of 5 microns and from 23 to 26 percent at a wavelength of 5.5 microns. Coefficients of thermal expansion for these glasses range from 5.80 to $7.37 \times 10^{-6}$/°C.

U.S. Pat. No. 3,982,952 also involves IR transmitting glasses consisting essentially of germania, lanthana, tantala and zinc oxide. Transmittances of these glasses at a wavelength of 5 microns range from 58 to 75 percent, and at 5.5 microns from 32 to 59 percent. Coefficients of thermal expansion range from 6.21 to $7.40 \times 10^{-6}$/°C. As is pointed out in this patent, a moderate coefficient of thermal expansion is a desired characteristic of these glasses to avoid fracture due to heat shock. Also, hardness so as to resist abrasive erosion is desired.

SUMMARY OF THE INVENTION

Glasses and glass-ceramics are disclosed comprising zinc oxide, alumina, tantala and germania. In one composition silica is added, and in another titania. The resulting materials have coefficients of thermal expansion ranging from; 4.09 to $6.19 \times 10^{-6}$/°C. while still retaining good IR transmittance. Also, the composition containing titania is substantially harder than the prior art compositions.

DESCRIPTION OF THE PREFERRED EMBODIMENTS

In accordance with the invention, glasses have been fabricated comprising primarily germania ($GeO_2$) tantala ($Ta_2O_5$) zinc oxide (ZnO) and alumina ($Al_2O_3$). In addition silica ($SiO_2$) and titania ($TiO_2$) have been added to the basic composition.

The amorphous glasses formed of the oxides above may be used in that form or may be further heat treated in a manner to be hereinafter described to form glass-ceramics.

Table I gives the compositions in both mole percentages and weight percentages for three specific glasses A, B and C, which have been fabricated, and Table II lists measured properties of these glasses and glass-ceramics.

Although specific compositions as given in Table I have actually been fabricated, it is possible to anticipate the effects on these basic compositions of varying the percent compositions based on not only the work of the present inventors but also published work including patents of others. Thus zinc oxide may represent anywhere from 15 to 30 mole percent of the composition. As indicated in aforementioned U.S. Pat. No. 3,982,952, the zinc oxide is necessary to form stable glasses while having little apparent effect on infrared transmission properties.

Alumina may range between 2 and 10 mole percent. Less than 2 percent is not desirable because the resulting glass becomes unstable, i.e. tends to devitrify, and more than 10 percent creates a composition which is difficult to melt because of the refractory nature of alumina.

Tantala may represent from 2 to 15 mole percent of the composition. Tantala (also as indicated in U.S. Pat. No. 3,982,952) depresses the thermal expansion coefficient of the glasses while improving physical hardness. The high cost of tantala makes the use of larger percentages prohibitive.

Germania may comprise 40 to 75 mole percent of the composition. With less than 40%, the resulting glass becomes unstable (tends to devitrify) and with more than 75%, the coefficient of thermal expansion increases detrimentally. The high cost of this oxide also militates against greater use.

Figure 1:
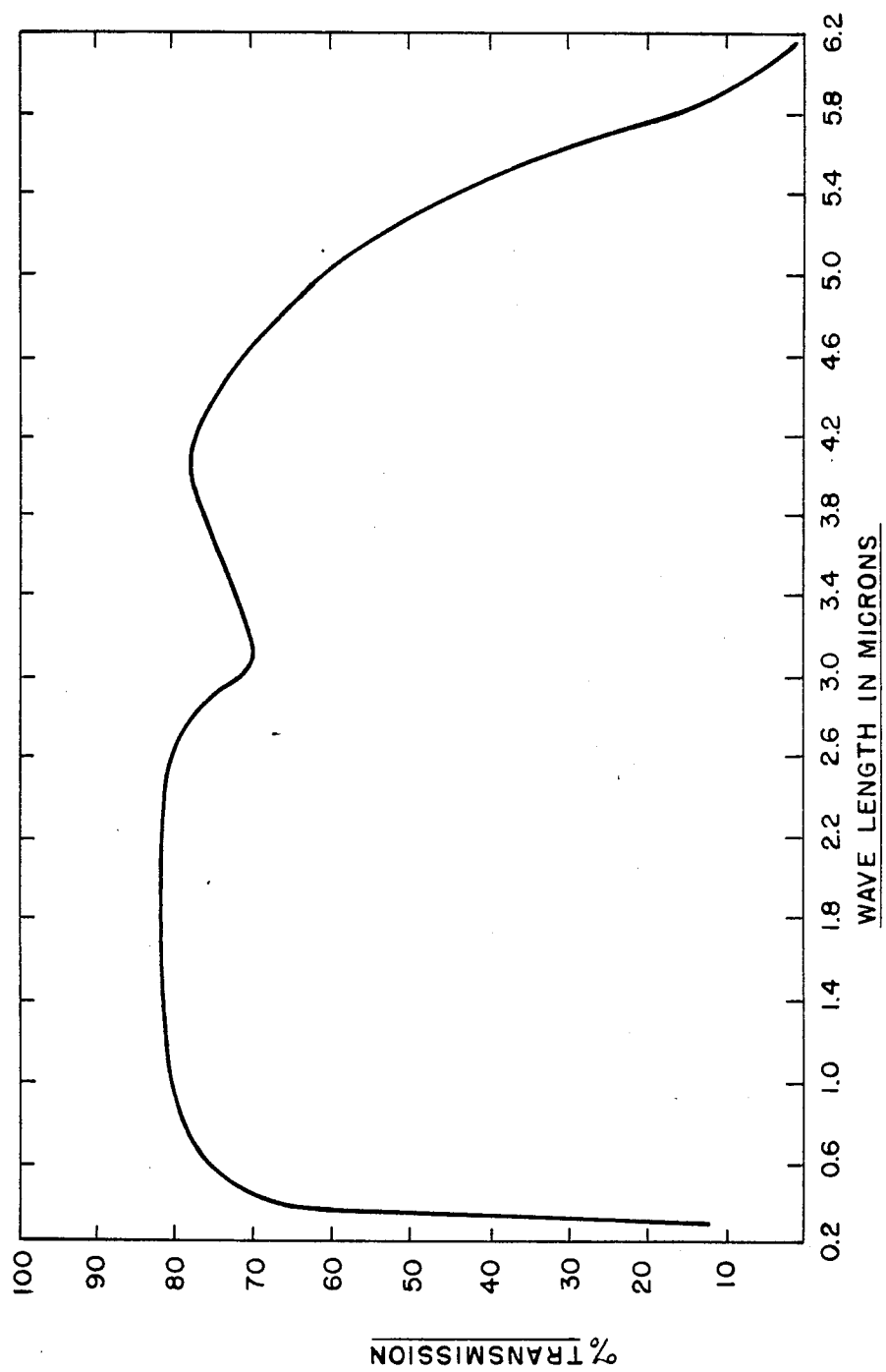
FIG. 1 discloses the specular transmittance of a glass fabricated in accordance with the invention.

A glass formed solely of the four oxides mentioned above has good characteristics for such purposes as windows for IR detecting devices and also has good transmittance from the ultraviolet, through the visible and the infrared spectra as shown in FIG. 1.

Figure 2:
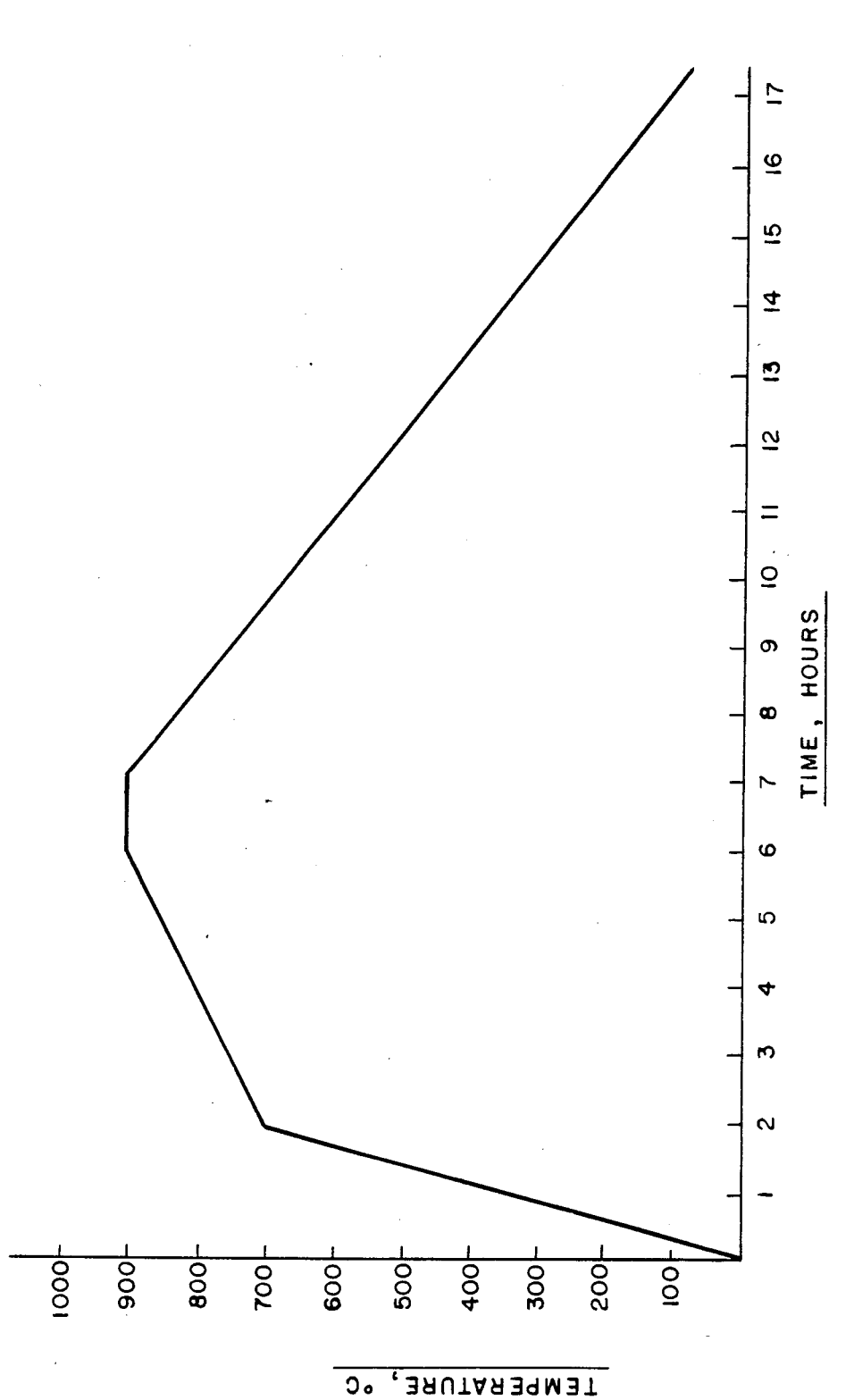
FIG. 2 is a time/temperature schedule for converting a glass fabricated in accordance with the invention to a glass-ceramic.

Referring to FIG. 2 it is contemplated that the glasses described above, which are formed when the compositions are heated to melting temperature, may be further heat treated to form glass-ceramics. Because the materials involved are all oxides, a special non-reactive atmosphere is not necessary in heating the glasses. The substitution in the glass of Example B of 5 mole percent of silica for an equivalent amount of germania improves the hardness of both the glass and the glass-ceramic, however, the IR transmittance is reduced somewhat. It is contemplated that silica may represent from 1 to 15 mole percent of a total composition.

Example C differs from Example A by the substitution of 5 mole percent of titania for an equivalent amount of germania. It is suggested that from 1 to 15 mole percent of titania will produce glasses and glass-ceramics having desirable characteristics. The substantial increase in the hardness of the glass-ceramic makes this material particularly good from the standpoint of abrasion resistance which is a desirable feature for radome applications.

Table II provides measured values of properties of interest of the glasses and glass-ceramics of this invention. The term "amorphous" is equivalent to glass.

The transmittance values at 5 and 5.5 microns are for the glasses. (Table III gives transmittance values for the Example C glass-ceramic.)

The hardness measurements were made using a one kilogram load. The hardness of the Example C glass-ceramic is of particular interest.

The coefficients of thermal expansion are lower (except for the Example C glass-ceramic) than those cited in the aforementioned patents. The Example C glass-ceramic has a thermal expansion well within the range conventionally reported for radome applications and the like.

Table III, as mentioned above, gives transmittances for the Example C glass-ceramic. It should be noted by comparision with FIG. 1, that above about 5.5 microns the transmittance of the glass-ceramic is higher than that of the glass of FIG. 1.

Table IV gives dielectric constant (K) and loss tangent values for the glass of Example A and the glass-ceramic of Example C. The values given are taken from graphs of plotted measurements. It is significant that the loss tangent values at a particular frequency remain relatively constant compared to currently used materials.

Although particular embodiments of glasses and glass-ceramics have been described, it will be obvious that changes and modifications can be made without departing from the spirit of the invention and the scope of the appended claims.

TABLE I
COMPOSITIONS OF EXAMPLES A, B & C

| | Mole Percent | | | Weight Percent | | |
|---|---|---|---|---|---|---|
| Oxide | A | B | C | A | B | C |
| ZnO | 20.0 | 20.0 | 20.0 | 12.2 | 12.4 | 12.3 |
| $Al_2O_3$ | 5.0 | 5.0 | 5.0 | 3.8 | 3.9 | 3.9 |
| $Ta_2O_3$ | 10.0 | 10.0 | 10.0 | 33.1 | 33.6 | 33.4 |
| $GeO_2$ | 65.0 | 60.0 | 60.0 | 50.9 | 47.8 | 47.4 |
| $SiO_2$ | | 5.0 | | | 2.3 | |
| $TiO_2$ | | | 5.0 | | | 3.0 |

TABLE II
MEASURED PROPERTIES OF EXAMPLES A, B & C

| | | | A | B | C |
|---|---|---|---|---|---|
| Density (g/cm$^3$) | | | 4.85 | 4.75 | 4.87 |
| Vickers Hardness | Amorphous | | 554 | 545 | 614 |
| (kg/mm$^2$) | Glass-Ceramic | | 549 | 624 | 841 |
| (1 kg load) | | | | | |
| Thermal | Amorphous | 25–300° C. | 4.14 | 4.09 | 4.24 |
| Expansion | | 25–500° C. | 4.57 | 4.52 | 4.62 |
| (10$^{-6}$/°C.) | Glass- | 25–300° C. | 4.47 | | 5.70 |
| | Ceramic | 25–500° C. | 4.89 | | 6.19 |
| % Transmittance at 5 μm | | | 65* | 71** | 71** |
| % Transmittance at 5.5 μm | | | 41* | 56** | 58** |

*1.3 mm thick polished
**0.4 mm thick unpolished

TABLE III
TRANSMITTANCE OF EXAMPLE C, GLASS-CERAMIC

| λ (microns) | % T |
|---|---|
| 2.5 | 48 |
| 3.0 | 50 |
| 3.5 | 54 |
| 4.0 | 57 |
| 4.5 | 59 |
| 5.0 | 57 |
| 5.5 | 52 |
| 6.0 | 43 |

TABLE IV

| | Example A - Glass | | | | Example C - Glass-Ceramic | | | |
|---|---|---|---|---|---|---|---|---|
| | 8.5 GHz | | 24 GHz | | 8.5 GHz | | 24 GHz | |
| Temp °C. | K | Loss Tangent × 10$^{+3}$ | K | Loss Tangent × 10$^{+3}$ | K | Loss Tangent × 10$^{+3}$ | K | Loss Tangent × 10$^{+3}$ |
| 25 | 9.58 | 5.8 | 9.92 | 8.5 | 17.6 | 4.2 | 16.15 | 1.6 |
| 100 | 9.74 | 5.8 | 10.00 | 8.2 | 17.7 | 3.7 | 16.15 | 2.1 |
| 200 | 9.86 | 5.9 | 10.06 | 7.7 | 17.7 | 3.2 | 16.2 | 2.0 |
| 300 | 9.80 | 6.0 | 10.18 | 7.3 | 17.6 | 2.6 | 16.17 | 1.9 |
| 400 | 10.09 | 6.2 | 10.34 | 8.0 | 17.0 | 2.6 | 16.11 | 2.0 |
| 500 | 10.90 | 5.4 | 10.51 | 10.0 | 17.6 | 3.4 | 16.11 | 2.2 |

I claim:

1. An infrared transmitting glass with coefficient of thermal expansion below $4.24 \times 10^{-6}$/°C. measured over a temperature range of 25° C. to 300° C. comprising:
   15–30 mole percent ZnO;
   2–10 mole percent $Al_2O_3$;
   2–15 mole percent $Ta_2O_5$; and
   40–75 mole percent $GeO_2$.

2. The glass of claim 1 further having:
   1–15 mole percent $SiO_2$.

3. The glass of claim 1 further having:
   1–15 mole percent $TiO_2$.

4. An infrared transmitting glass-ceramic with coefficient of the thermal expansion below $5.70 \times 10^{-6}$/°C.

measured over a temperature range of 25° C. to 300° C. comprising:
- 15-30 mole percent ZnO;
- 2-10 mole percent $Al_2O_3$;
- 2-15 mole percent $Ta_2O_5$; and
- 40-75 mole percent $GeO_2$.

5. The glass-ceramic of claim 4 further having:
- 1-15 mole percent $SiO_2$.

6. The glass-ceramic of claim 4 further having:
- 1-15 mole percent $TiO_2$.

7. A composition for producing infrared transmitting glasses and glass-ceramics with coefficients of thermal expansion below $5.70 \times 10^{-6}$/°C. measured over a temperature range of 25° C. to 300° C. comprising:
- 15-30 mole percent ZnO;
- 2-10 mole percent $Al_2O_3$;
- 2-15 mole percent $Ta_2O_5$;
- 40-75 mole percent $GeO_2$; and
- 1-15 mole percent $SiO_2$.

8. A composition for producing infrared transmitting glasses and glass-ceramics with coefficients of thermal expansion below $5.70 \times 10^{-6}$/°C. measured over a temperature range of 25° C. to 300° C. comprising:
- 15-30 mole percent ZnO;
- 2-10 mole percent $Al_2O_3$;
- 2-15 mole percent $Ta_2O_5$;
- 40-75 mole percent $GeO_2$; and
- 1-15 mole percent $TiO_2$.

* * * * *